March 23, 1954 D. KALISH 2,672,684
GARDENING SHEARS
Filed Aug. 5, 1952
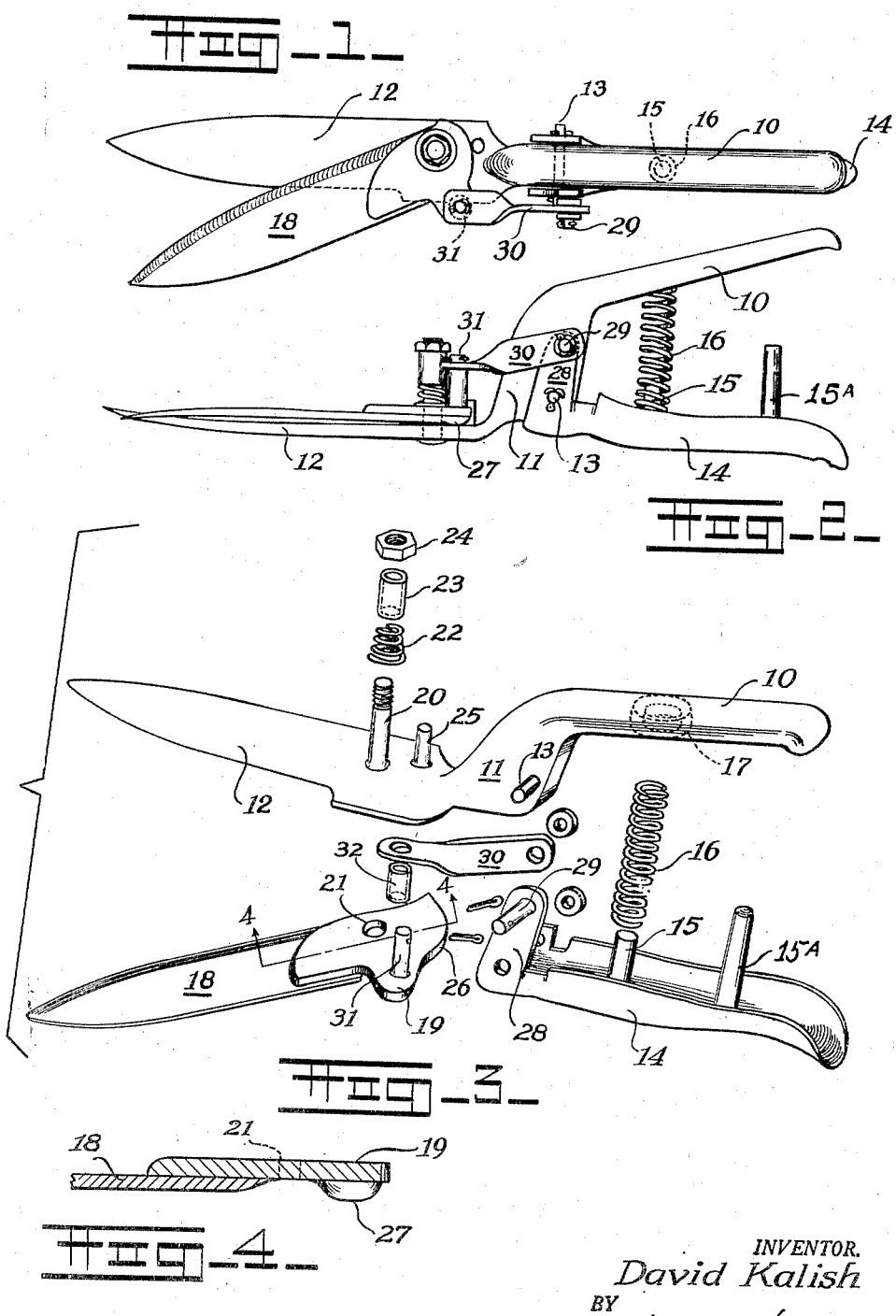
INVENTOR.
David Kalish
BY
W. B. Harpman
ATTORNEY Patented Mar. 23, 1954

2,672,684

UNITED STATES PATENT OFFICE 2,672,684

GARDENING SHEARS

David Kalish, Alliance, Ohio, assignor to The Lewis Engineering and Manufacturing Company, Alliance, Ohio, a corporation of Ohio Application August 5, 1952, Serial No. 302,653

1 Claim. (Cl. 30—248)

This invention relates to a gardening shears and more particularly to a grass shear having a smooth easy cutting action.

The principal object of the invention is the provision of a grass shear having a fixed blade and a movable blade capable of being moved along a straight line while being operated.

A further object of the invention is the provision of a shear designed to permit cutting of grass, shrubs and the like closely to walls and other obstructions without skinning the knuckles of the operator.

A still further object of the invention is the provision of a shear which is very narrow as compared with grass shears heretofore known in the art and of relatively low height enabling the same to be used in narrow locations and stored in a very small space.

A still further object of the invention is the provision of a shears which can easily be taken apart for sharpening and readily re-assembled by an unskilled person.

A still further object of the invention is the provision of a shears in which a movable blade is pivotally mounted on a fixed blade and yieldingly held in engagement thereagainst throughout cutting movement thereof.

The grass shears disclosed herein comprises an improvement in the art as heretofore known and which are generally related to complicated methods and mechanisms of mounting a movable blade on a fixed blade and handle and imparting movement thereto from one of the handles of the shears.

Typical of such prior art shears are those of the Ginnel Patent No. 1,562,630 and Keiser 2,281,- 977 and 2,407,237. In these patents, as in the other similar shears known in the art, shears of the general type are disclosed but without the specific blade mounting and actuating means as disclosed herein which renders the present shears capable of more ready manufacture and at the same time makes it much easier to assemble and use.

The principal novelty in the presently disclosed shears is the specific mounting of the movable blade on the fixed blade and handle and the arrangement by which the movable handle and the movable blade are operatively connected so that vertical movement of the movable handle imparts horizontal movement to the blade through a simple twisted link connection.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of the shears.

Figure 2 is a side view of the shears.

Figure 3 is an exploded view showing the various parts of the shears in spaced relation to one another.

Figure 4 is a cross section taken on line 4—4 of Figure 3.

By referring to Figures 1 and 2 of the drawings it will be seen that the shears comprises a fixed handle 10, the forward end 11 of which is downwardly inclined and a forward extension 12 thereof forms a fixed blade. The downwardly inclined portion 11 of the fixed handle 10 is thickened rearwardly to provide for the location of a transverse pivot pin 13 by means of which the lower movable handle 14 is pivotally mounted on the shears. The lower handle 14 is U-shaped in cross section and has a spring mounting pin 15 and a stop pin 15A affixed to its inner surface and extending vertically thereabove. The pin 15 forms a retaining guide for a coil spring 16 which is positioned between the fixed handle 10 and the movable handle 14 and is caged in position on the movable handle 14 by a collar 17 positioned therein, as best shown in dotted lines in Figure 3 of the drawings. A movable blade 18 having a heel plate 19 affixed to its innermost end is pivotally mounted on the fixed blade 12 by means of a threaded pivot pin 20.

The threaded pivot pin 20 registers in an opening 21 in the heel plate 19 in the movable blade 14 as best seen in Figure 3 of the drawings.

The movable blade 18 is held in desirable movable relation to the fixed blade 12 under appropriate tension by a coil spring 22, a sleeve 23 and a nut 24 which are engaged in that order on the threaded pivot pin 20 over the movable blade 18. The fixed blade 12 has a stop pin 25 mounted thereon adjacent the threaded pivot pin 20 which is adapted to engage a cam surface 26 on the heel plate 19 when the movable blade 18 is in fully open position so as to prevent further operating of the blades or the handles of the shears.

The heel plate 19 has a downwardly extending boss 27, as best seen in Figure 4 of the drawings, which compensates for the offset existing between the heel plate 19 and the movable blade 18 and at the same time provides a bearing surface against the fixed blade 12 which acts to hold the same in desirable relation when the same is moved in a cutting action.

It will occur to those skilled in the art that grass shears of this general type are provided with oppositely curved blades: that is to say, the lower fixed blade is curved upwardly slightly and the upper movable blade is curved downwardly slightly so that as the blades move from open to closed position, the same tension is maintained at the points of engagement throughout the progressive forward movement of said point of engagement. This action enables the grass shear to effectively cut near the tips thereof as well as near the pivot point thereof. This action in the present shear is enhanced by the spring mounting of the movable blade as yieldable suitable tension is always exerted by the coil spring 22.

By referring now to Figures 2 and 3 of the drawings it will be seen that the movable handle 14 has an upwardly extending arm 28 thereon and the upper end of which is provided with a sidewardly extending pivot pin 29. The pivot pin 29 engages an opening in one end of a twisted link 30. The other end of the twisted link 30 is on a horizontal plane and is provided with an opening so that it may register with a blade pivot pin 31 formed on the heel plate 19. In order that the horizontal end of the twisted link 30 will be retained in desired elevated relation above the heel plate 19, a sleeve 32 is provided for positioning on the blade pivot pin 31, as shown in Figure 2 of the drawings.

It will thus be seen that a relatively simple grass shears has been disclosed which incorporates only a few movable parts assembled in such a manner that an easy operating action is obtained.

It will occur to those skilled in the art that the provision of the twisted link 30 and the arm 28 and pin 31 provides a practical and efficient means of translating vertical movement of the movable handle 14 to horizontal movement of the movable blade 18 and that such movement is incapable of efficiently affecting the registry of the movable blade 18 with the fixed blade 12. In the shears heretofore known in the art attempting to translate such motion, the movable blade has invariably tilted to relatively inoperative position during at least part of its motion which rendered the shears relatively ineffective. However, the present invention achieves a desirable blade relation at all points therebetween through the simple and efficient linkage herein disclosed.

It will also be observed that the coil springs 16 and 22 are relatively inexpensive, that they are easily replaced if necessary and that they can be held to close manufacturing tolerances to form a perfectly balanced, easily operated shears while at the same time permitting the blades of the shears to be taken apart and replaced as for sharpening without an involved mechanical operation.

It will thus be seen that the several objects of the invention have been met by the shears disclosed herein.

Having thus described my invention, what I claim is:

Gardening shears including a fixed handle having a downwardly forwardly inclined forward end section with a fixed blade extending forwardly therefrom, said fixed blade having a cutting edge, a pivot pin on the fixed blade, a movable blade having a heel plate secured thereto and pivotally mounted on said pivot pin, the movable blade having a cutting edge for registry with the fixed blade, a pivot pin positioned transversely of the lower part of said forward end section of the fixed handle, a movable handle pivotally mounted at its forward end on said last mentioned pivot pin, an arm on the forward end of the movable handle extending upwardly therefrom at substantially a right angle thereto and terminating below the upper part of the fixed handle, a pivot pin on the upper end of said arm extending laterally therefrom, said last mentioned pivot pin being located above the pivot pin that extends transversely of the lower part of the forward end section of the fixed handle, a pivot pin on the heel plate of the movable blade, and a single link member interconnecting the pivot pin on the upper end of said upwardly extending arm to the pivot pin on the heel plate, said link member being of twisted formation having longitudinally extending pivot engaging eye portions at opposite ends disposed at substantially a right angle to each other.

DAVID KALISH.

References Cited in the file of this patent

UNITED STATES PATENTS

| Number | Name | Date |
| --- | --- | --- |
| 1,562,630 | Ginnel | Nov. 24, 1925 |
| 1,987,375 | Simonsen et al. | Jan. 8, 1935 |
| 2,208,949 | Rauh | July 23, 1940 |
| 2,281,977 | Keiser | May 5, 1942 |
| 2,407,237 | Keiser | Sept. 10, 1946 |
| 2,607,114 | Keiser | Aug. 19, 1952 |